(12) United States Patent
Brewer

(10) Patent No.: US 8,762,527 B2
(45) Date of Patent: Jun. 24, 2014

(54) METHOD AND SYSTEM FOR CONDUCTING SECURE TRANSACTIONS

(75) Inventor: Joel Brewer, Austin, TX (US)

(73) Assignee: Visa International Service Association, San Francisco, CA (US)

(*) Notice: Subject to any disclaimer, the term of this patent is extended or adjusted under 35 U.S.C. 154(b) by 614 days.

(21) Appl. No.: 13/037,833

(22) Filed: Mar. 1, 2011

(65) Prior Publication Data

US 2011/0320310 A1    Dec. 29, 2011

Related U.S. Application Data

(60) Provisional application No. 61/359,146, filed on Jun. 28, 2010.

(51) Int. Cl.
*G06F 15/173* (2006.01)
*G06F 15/16* (2006.01)
*H04L 29/08* (2006.01)

(52) U.S. Cl.
CPC ...... *H04L 29/0809* (2013.01); *H04L 29/08072* (2013.01)

USPC ............................ 709/225; 709/229; 705/26.1

(58) Field of Classification Search
None
See application file for complete search history.

(56) References Cited

U.S. PATENT DOCUMENTS

2004/0122907 A1* 6/2004 Chou et al. ..................... 709/207
2010/0325006 A1* 12/2010 White ............................. 705/26

* cited by examiner

*Primary Examiner* — Ryan Zeender
*Assistant Examiner* — Denisse Ortiz Roman
(74) *Attorney, Agent, or Firm* — Kilpatrick Townsend & Stockton LLP

(57) ABSTRACT

A system for conducting secure on-line transactions includes a user communication device, a third party server, and one or more merchant servers. The user communication device can communicate with one or more preapproved merchants from within a virtualized environment using a custom browser. The custom browser supports only a single connection at any given time and only if the connection is to one of the preapproved merchants. The merchant website includes a custom markup language that can be parsed by the custom browser to render web pages on the user communication device.

22 Claims, 4 Drawing Sheets

METHOD AND SYSTEM FOR CONDUCTING SECURE TRANSACTIONS

CROSS-REFERENCES TO RELATED APPLICATIONS

This application claims benefit under 35 USC §119(e) to U.S. Provisional Patent Application No. 61/359,146 filed Jun. 28, 2010 and entitled "Online Browser Security" the disclosure of which is incorporated by reference herein in its entirety for all purposes.

BACKGROUND

E-commerce has grown exponentially over the past decade. In addition, consumers are increasingly using the Internet to perform various other transactions such as banking, information gathering, etc. However, security associated with these on-line transactions has always been a cause for concern for all users. These concerns about security has both hindered growth of on-line transactions and undermined consumer confidence in on-line transactions. One of the major areas of concern for consumers is protecting their sensitive information from getting into the hands of criminals.

One of the predominant ways of stealing sensitive consumer information such as credit card numbers, birth dates, social security numbers, etc. is to hack into a merchant website or into a consumer's computer and steal this information. It is more difficult to compromise a merchant website since most of the reputed merchants use sophisticated technology to keep out the criminals. However, consumer communication devices, e.g., a computer, often lack adequate protection against unauthorized access making them an easy target for stealing sensitive information.

Hackers use numerous techniques such as, Cross-Site Scripting (CSS), Cross-Site Request Forgery (CSRF), Phishing, Cross-frame Scripting, Man-in-the-Middle (MIM), browser cache attacks, cookie exposure, etc. to gain access to sensitive consumer and/or merchant information. One of the predominant methods to conduct these attacks is via an Internet browser, e.g., Internet Explorer, that may be resident on a consumer computer this is usually used to conduct on-line communications and e-commerce transactions.

Conventional techniques for preventing such attacks include providing a sand-boxed environment for conducting on-line transactions. However, even the sandbox solutions are not immune from CSRF attacks that exploit the trust a website has for a user of the website.

What is needed is a system and method to alleviate and mitigate these threats and to provide a secure environment for conducting on-line transactions.

SUMMARY

Embodiments of the present invention generally relate to on-line security. More specifically, certain embodiments of the present invention provide a method and system for conducting secure on-line transactions.

Some embodiment of the present invention provide a method for conducting secure payment transactions. The method includes establishing connection with a user communication device, placing the user communication device in a virtualized environment upon successful connection, initiating a custom browser from within the virtualized environment, presenting a list of merchants to the user communication device via the custom browser, receiving an input from the user communication device indicative of selection of a first merchant from among the list of merchants, establishing a first session between the user communication device and a server of the first merchant; and directing the user communication device to a website of the first merchant. In some embodiments, the custom browser only allows connection to the server of the first merchant during the first session and blocks all other communication requests from other external systems.

In the method, the list of merchants includes merchants that are pre-approved. In some embodiments, the computer system allows the user communication device to only communicate with merchants in the list of merchants. In some embodiments, the custom browser does not support one or more of a scripting language, cookies, browser cache, browser history, browser bookmarks, and browser redirects. In some embodiments, the method further includes receiving input from the user communication device including payment information to pay for an item purchased at the first merchant, where the payment information includes information about a payment device. The method further includes communicating with an issuer associated with the payment device to authorize the payment, and if the payment is authorized, sending a payment approval ticket to the first merchant. In some embodiments, information about the payment device is not communicated to the first merchant. In some embodiments, the information about the payment device is stored in the computer system.

In some embodiments, communicating with the issuer is performed outside of the virtualized environment and without using the custom browser. In some embodiments, the method further includes receiving input from the user communication device to terminate connection with the server of the first merchant, terminating the connection with the server of the first merchant, receiving another input from the user communication device indicative of selection of a second merchant from the list of merchants, establishing a new session between the user communication device and a server of a second merchant, where the computer system allows the user communication device to only communicate with the server of the second merchant during the time when the new session is active.

Some embodiments of the present invention provide a method for processing payment transactions performed by a computer system. The method includes establishing a connection between a user communication device and a merchant website from within a virtualized environment on the computer system, where the merchant website being selected from a list of pre-approved merchant websites, receiving a first input indicative of purchase of an item from the merchant website, receiving a payment request message from a merchant server associated with the merchant website, receiving a second input indicative of selection of a payment method, sending a payment authorization request to a payment processing network, receiving a payment ticket from the payment processing network indicative of results of the payment authorization request, and communicating the payment ticket to the merchant server.

In some embodiments, the method further comprises receiving input from the merchant server indicative of successful completion of the purchase. In an embodiment the computer system only allows connections between the user communication device and a merchant website from the list of pre-approved websites. In some embodiments, the computer system allows connection between the user communication device and only a single merchant website at any given time. In some embodiments, the connection between the user communication device and a merchant website is achieved via a custom browser operating within the virtualized environment. In certain embodiments, the custom browser does not support one or more of standard scripting languages, browser cache, cookies, browser history, browser bookmarks, and browser redirects. In some embodiments, details about the payment method are not communicated to the merchant serve and the payment authorization request is sent to the payment processing network outside of the virtualized environment.

Certain embodiment of the invention provide a non-transitory computer-readable medium including instructions which when executed by a processor within a computer system, causes the processor to perform any of the methods described above.

The following detailed description, together with the accompanying drawings will provide a better understanding of the nature and advantages of the present invention.

DETAILED DESCRIPTION

Embodiments of the present invention generally relate to secured on-line transactions. More specifically, certain embodiments of the present invention provide a method and system for conducting secure on-line transactions that includes a custom browser running in a virtualized environment and a list of preapproved merchants that can be accessed using the custom browser.

In some embodiments, a system that enables an on-line e-commerce is provided. The system may include a server that provides a virtualized environment. The virtualized environment may host a custom browser that is capable of connecting to one or more merchant websites. The server may also include links to websites of one or more pre-approved merchants that a user may visit using the custom browser. The custom browser may have specialized security features as discussed below to ensure security of the transactions conducted using the custom browser.

Some embodiments of the present invention provide a method for conducting a transaction. The method may include a user computer connecting with a third-party server. The third-party server may provide a secure environment for the user to conduct on-line transactions. The method may further include launching a custom browser, displaying a list of merchant websites on the user computer, accepting an input from the user computer that selects a website from the displayed websites, and directing the user's computer to the selected website. In some embodiments, the third-party server may allow the user computer to connect to only one website at a time.

Figure 1:
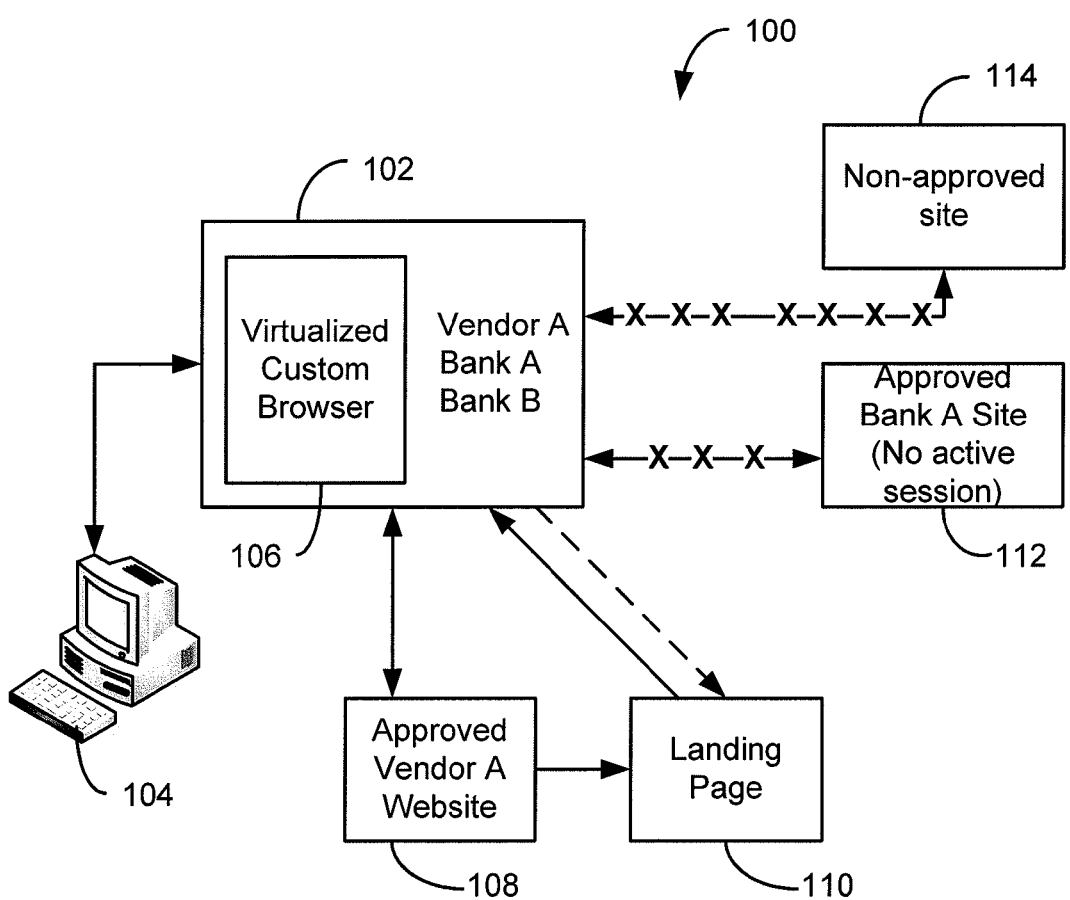
FIG. 1 is a block diagram illustrating a system for securely conducting on-line transactions according to an embodiment of the present invention.

FIG. 1 is a block diagram of a system 100 for conducting an on-line transaction according to an embodiment of the present invention. System 100 includes a user communication device 104, a server 102 running a custom browser 106, and a server hosting a merchant website 108 that includes a landing page 110.

User communication device 104 can be implemented using any device that can communicate with an external system. Examples of user communication device 104 can include a computer, a PDA, a mobile phone, a tablet computing device, etc. User communication device 104 can communicate with an external system using either a wired medium or a wireless medium.

Server 102 can be implemented, e.g., using the computer system of FIG. 4 below. In some embodiments, server 102 can host a virtualized custom browser 106. Custom browser 106 may be specifically configured to operate on server 102. Server 102 may provide a virtualized environment that may host custom browser 106. In some embodiments, the virtualized environment allows one or more applications like custom browser 106 to be run in a protected virtual space isolated from the underlying operating system. In some embodiments, server 102 can also host a merchant portal. A merchant portal in this context means that server 102 can include a listing of websites of one or more merchants. In some embodiments, the merchants may be pre-approved via an approval process that may be independent of the merchant portal. In some embodiments, the merchants may include retail outlets like Sears, Target, etc., financial institutions such as banks, or other entities with whom the user may interact using sensitive information such as credit card numbers, date of birth, etc.

In some embodiments, the merchants may undergo a rigorous approval process before being listed on the merchant portal. As part of the approval process, the merchants may be asked to conform to certain guidelines with respect to interactions of merchant servers with server 102 and user communication device 104. Details of some of the guidelines are discussed below. In some embodiments, server 102 may allow connections to only approved vendors, e.g., merchants 112 or 108. Any connections requested to a non-approved merchant 114 may be blocked by server 102. In some embodiments, server 102 may allow connection to only one merchant at a time. For example, as illustrated in FIG. 1, both merchant 108 and merchant 112 are approved merchants. However, if there is a current active session between user communication device 104 and merchant 108, server 102 may not allow another connection to be opened with merchant 112. Only after the session with merchant 108 has ended, server 102 may allow connection with merchant 112. As discussed above, non-approved merchant website 114 is completely blocked out and no connection to or from merchant website 114 is allowed.

In operation, user communication device 104 may connect with server 102 using predetermined authentication credentials, e.g., login name and password. In some embodiments, other authentication techniques such as smartcard, client certificates, two-factor authentication, etc. may also be used to gain access to server 102. In some embodiments, user communication device 104 may establish a secure communication channel with server 102 using, e.g., SSL or VPN tunnel. Upon connecting with server 102, user communication device 104 may be placed in a virtualized secure environment. This virtual environment is isolated from the operating systems and other components of server 102 as well as that of user communication device 104. No information received or sent when operating from within the virtual environment may affect any other systems of server 102 and/or user communication device 104.

Once user communication device 104 is placed in the virtualized environment, custom browser 106 may be automatically launched. In some embodiments, the user may launch custom browser 106 from within the virtualized environment. Once launched, custom browser 106 may present a list of approved merchants to the user on user communication device 104. In some embodiments, the list may be presented in a textual form where the text provides a clickable link, e.g., a URL, to the merchant website. In other embodiments, the list may include selectable icons/logos that the user may select to visit the associated merchant website. The user may select one of the merchants, e.g., merchant 108, from the list. Upon selection of the merchant, server 102 may open a secure communication channel with the selected merchant. In some embodiments, the secure connection may be established over SSL channels which may comprise, e.g., Visa rooted CA signed server and client certificates, or Public Key Infrastructure (PKI). In some embodiments, once server 102 establishes a connection with a merchant, all other merchant links may be disabled so that the user may not select another merchant until the connection with the currently selected merchant is terminated. In other embodiments, if a user attempts to connect to another merchant when one connection is still active, server 102 may generate an error message and block access to the other merchant.

In some embodiments, each approved vendor may provide a predefined landing page, e.g., landing page 110, for any user navigating to the merchant website via server 102. In some embodiments, the landing page may be defined as part of the merchant approval/certification process. In some embodiments, the landing page may include XML or other custom markup language. Custom browser 106 may read the information in markup language, parse the markup, and build an HTML page that may be then rendered in custom browser 106 and presented to the user on user communication device 104. In some embodiments, scripting languages such as JavaScript, ActiveX, HTML or any scripting language other than the approved scripting language may not be rendered in custom browser 106 at any time during the current active session.

From landing page 110, the user may navigate to other sections of merchant website 108. All subsequent actions performed at that merchant website 108 may go through the same type of mechanism. For example, POST or GET actions may result in a new set of markup being parsed and rendered in the custom browser 106. The consumer can then end the session with merchant website 108 by e.g., clicking a close session button, closing customer browser 106, terminating the session to server 102, removing a smartcard coupled to user communication device 104, closing the VPN, or SSL tunnel and by logging off user communication device 104. Once the session with merchant website 108 is terminated, user communication device 104, if still authenticated to server 102, may visit another merchant website from the approved merchant list.

As discussed above, each merchant may be pre-approved before they can be listed on the merchant portal. This ensures that each merchant website accessible via server 102 conforms to the security guidelines defined by the entity operating server 102. In some embodiments, during the merchant approval phase, the merchant may be able to upload branding elements. The merchant may then provide a skin ID and custom browser 106 may render it to cut down on the size of the markup documents. For example, the merchant may define color schemes, logos, etc. for the landing page and upload that information to server 102. The customized information for each merchant can be identified using a skinID. When a consumer visits the landing page of a merchant, the markup code can include the skinID and the custom browser can render the correct landing page.

As discussed above, custom browser 106 is specially configured so as to provide a secure mode of communication with the merchant websites. In some embodiments, custom browser 106 may not support any other scripting languages or plug-ins natively, cookies, browser history storage, or caching of any information. This provides for a very secure environment that is immune from any of the browser attack methods mentioned above. In addition, custom browser 106 may allow opening of only one session with a single approved merchant at a time. Thus, at any given time the user can only interact with a single approved merchant website. If the user attempts to connect to another approved merchant site while a session is already open, custom browser 106 may not allow that connection.

As discussed earlier, the landing page is generated using a custom markup language. The custom browser can parse the custom markup and render a page based on the markup. The custom markup language may include predefined tags and child elements. These would then be parsed, determined to be valid according to specification or protocol, and rendered in custom browser 106 or a browser-like application. At no time, would standard HTML, JavaScript, any other scripting language, or application plug-ins be allowed to be rendered, stored, or installed into custom browser 106. An example of the custom markup language is provided below. It is to be noted that the example below is for illustrative purpose only.

```

<brandingSection>
    <bName>Merchant A</bName>
    <bAbout>Merchant A is the ultimate source for widgets.</bAbout>
    <bLogo>merchantA.jpg</bLogo>
</brandingSection>
<skinType>Default</skinType>
<pageTitle>Welcome Screen</pageTitle>
<preForm1Content>Welcome to the ultimate site to fine custom widgets.</preForm1Content>
<form1>
    <action>searchSiteServlet</action>
    <method>POST</method>
    <control1>
        <type>label</type>
        <value>Search Terms Here</value>
    </control1>
    <control2>
        <type>textbox</type>
        <validation>string15chars</validation>
    </control2>
    <control3>
        <type>button</type>
        <value>Submit</value>
        <action>form1action</action>
    </control3>
</form1>

```

Figure 2:
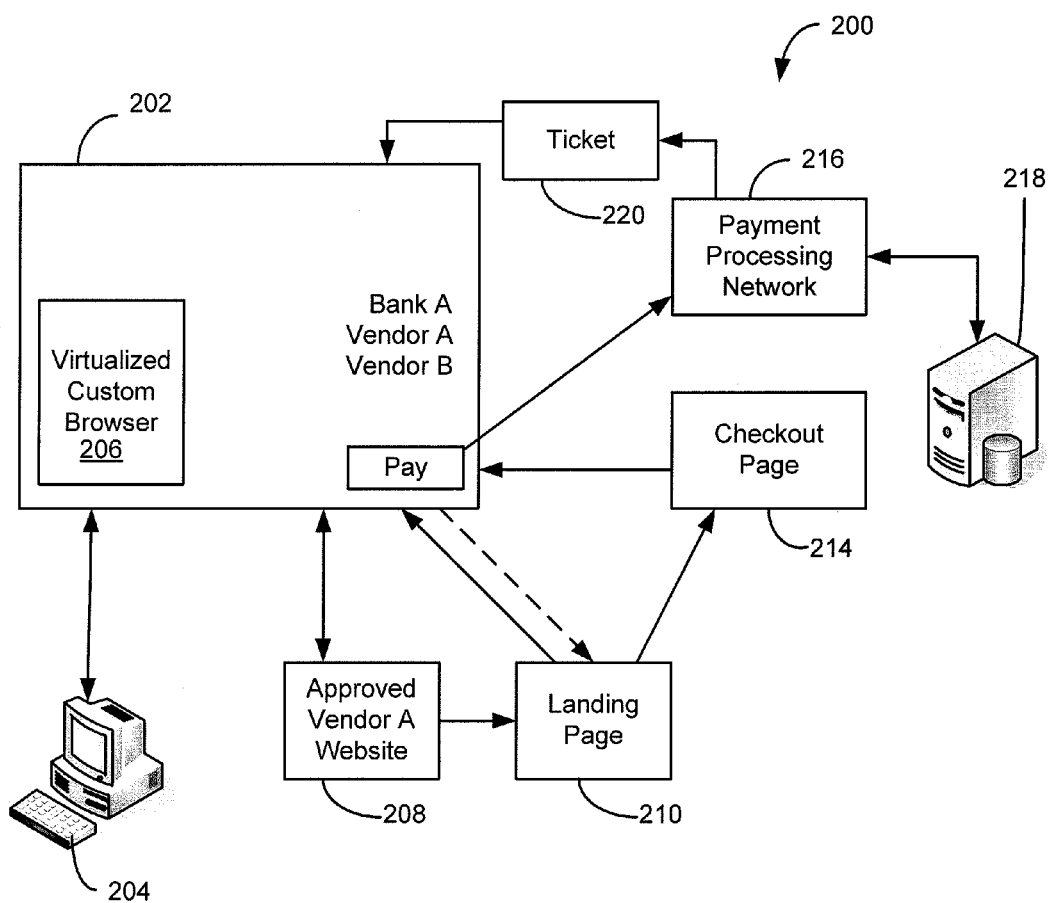
FIG. 2 is a block diagram illustrating a system for conducting payment transactions using a secured environment according to an embodiment of the present invention.

Once the user is connected to a merchant website he can navigate the website in order to conduct a transaction. In some embodiments, the user may buy an item from the merchant and pay for the item using his/her user communication device. FIG. 2 is a block diagram of a system 200 that may be used for securely conducting an on-line transaction using the custom browser according to an embodiment of the present invention.

System 200 includes a user communication device 204, server 202, custom browser 206, and merchant server hosting the merchant website 208. User communication device 204 may be same as user communication device 104 of FIG. 1, custom browser 206 may be the same as custom browser 106 of FIG. 1 and merchant website 208 may be same as the merchant website 108 of FIG. 1. Therefore, description of these features is omitted here for brevity. Please refer to FIG. 1 and associated description above for details regarding these features.

A user may use user communication device 204 to establish a connection with server 202. Once the connection is established, custom browser 206 may be launched and server 202 may present a list of approved merchants to the user via custom browser 206. The user may select a merchant from the list and get connected to the selected merchant's website 208. Custom browser 206 may render the associated landing page 210 of merchant website 208. After the user has selected an item or items to purchase, the merchant website may direct custom browser 206 to a checkout page 214. Checkout page 214 may be created using the same custom markup language discussed above. At checkout page 214, the user may be given an option to pay for the item(s) that he/she purchased. The user may then select a payment device to pay for the purchased item. A payment device may be any of a credit card, a debit card, a smart card, a mobile phone with payment card information stored in it, or a virtual card. In some embodiments, if the user decides to pay, he may select a "pay" button displayed on checkout page 214. This may result in the merchant sending a payment request message to server 202. In some embodiments, the payment request message may include the description of items bought by the user, total amount of the purchase, merchant identifier, transaction ID, and other relevant transaction details.

Upon electing to pay using a payment device, a separate application resident either on server 202 or on user communication device 204 may communicate with a payment processing network 216 for authorizing the payment. In some embodiments, details of the payment device may be stored on user communication device 204. In other embodiments, server 202 may store the payment device details as part of the user registration process. In either case, server 202 may send a payment authorization message to payment processing network 216. The payment authorization message may include the payment device details and information received from the merchant via the payment request message as described above. Payment processing network 216 may communicate with an issuer 218 of the payment device, to authorize the payment. If the payment is authorized, payment processing network 216 may generate a ticket 220 that includes the authorization information. Payment processing network 216 may then send ticket 220 along with additional information to the merchant via server 202. The merchant may receive ticket 220 and determine that the user has paid for the item. The merchant may then process the transaction and subsequently ship the item to the user. A merchant acquirer may then settle the transaction amount with payment processing network 216 and issuer 218 according to predefined credit transaction rules. In addition, payment processing network 216 may send a notification to user communication device 204, via server 202, that the transaction was successful. Alternatively, the merchant may inform the user, via custom browser 206, that the payment was successful.

It is to be noted that at no point during the transaction does the merchant receive the payment device details of the user. The merchant merely receives a conformation from payment processing network 216, in form of ticket 220, that the user has paid for his purchases. Based on that confirmation, the merchant completes the transaction. In some embodiments, the payment process can be performed outside of the virtualized environment. In this instance, a payment application may run outside of the virtualized environment of server 202 and may interact with payment processing network 216 to complete the payment authorization process. Thus, in some embodiments, the payment application may be resident on user communication device 204. In some embodiments, server 202 and payment processing network 216 may be implemented as a single entity thereby further enhancing the security of the system. In this instance, the combined server can provide the secure virtualized environment and also process the payments for the user. For example, the combined server can be operated by a third-party entity such as VISA Inc. that can also provide payment processing capability.

In some embodiments, the payment application may operate within the virtualized environment and may be resident on server 202. In this instance, once the user has selected a payment device to pay for the items, the payment application may communicate with payment processing network 216 to complete the payment authorization process from within the virtual environment. This process can be transparent to the user. Once the payment authorization process is completed, the user may be notified, via merchant website 208, that the payment was successful or unsuccessful.

In the instance where server 202 and payment processing network 216 are implemented as a single entity, once the user elects to pay for the item and selects a payment device, server 202 may perform the payment authorization process and provide ticket 220 to the merchant. In some embodiments, the user may designate a payment device for use with all on-line transactions and store the payment device details on server 202. In this instance, once the user selects the 'pay' button, server 202 can automatically use the designated payment device information to complete the transaction without any further input from the user. This will further enhance the security since the user now does not even have to enter the payment device details, e.g., via is keyboard, thereby eliminating threats from a key logger program that a hacker might use to track user input.

Many advantages may be realized by embodiments of the present invention. From a user's perspective, a more secure environment for browsing and conducting transactions over the Internet can be provided. In addition, the user does not have to provide his payment information to any merchant thereby reducing the likelihood that his information may be stolen. Further, since the payment device details can be stored on the server, even if the user communication device is compromised, the payment device details cannot be stolen. In addition, since the user communication device is isolated from other on-line traffic when connected to the third party server, there is decreased likelihood that someone can hack into the user communication device. In addition, since the merchants are preapproved, the user has the confidence that he is dealing with only reputable merchants.

From the merchant's point of view, having a secure link to a user's communication device alleviates some of the attacks, e.g., CSRF, that may originate from the user communication device. Since a merchant has no control over the level of security employed in a user communication device, having a neutral third party providing a secure link with the user communication device is advantageous for the merchant. In addition, since the third-party server handles the payment processing, the merchant does not have to store and care for the payment information of the users. Merchants may realize a significant lowering of liability since now they do not need to store any sensitive financial data of the user. For the third-party entity operating the server, it provides additional revenue opportunity, e.g., subscriptions, as more merchants and user's sign up.

Figure 3:
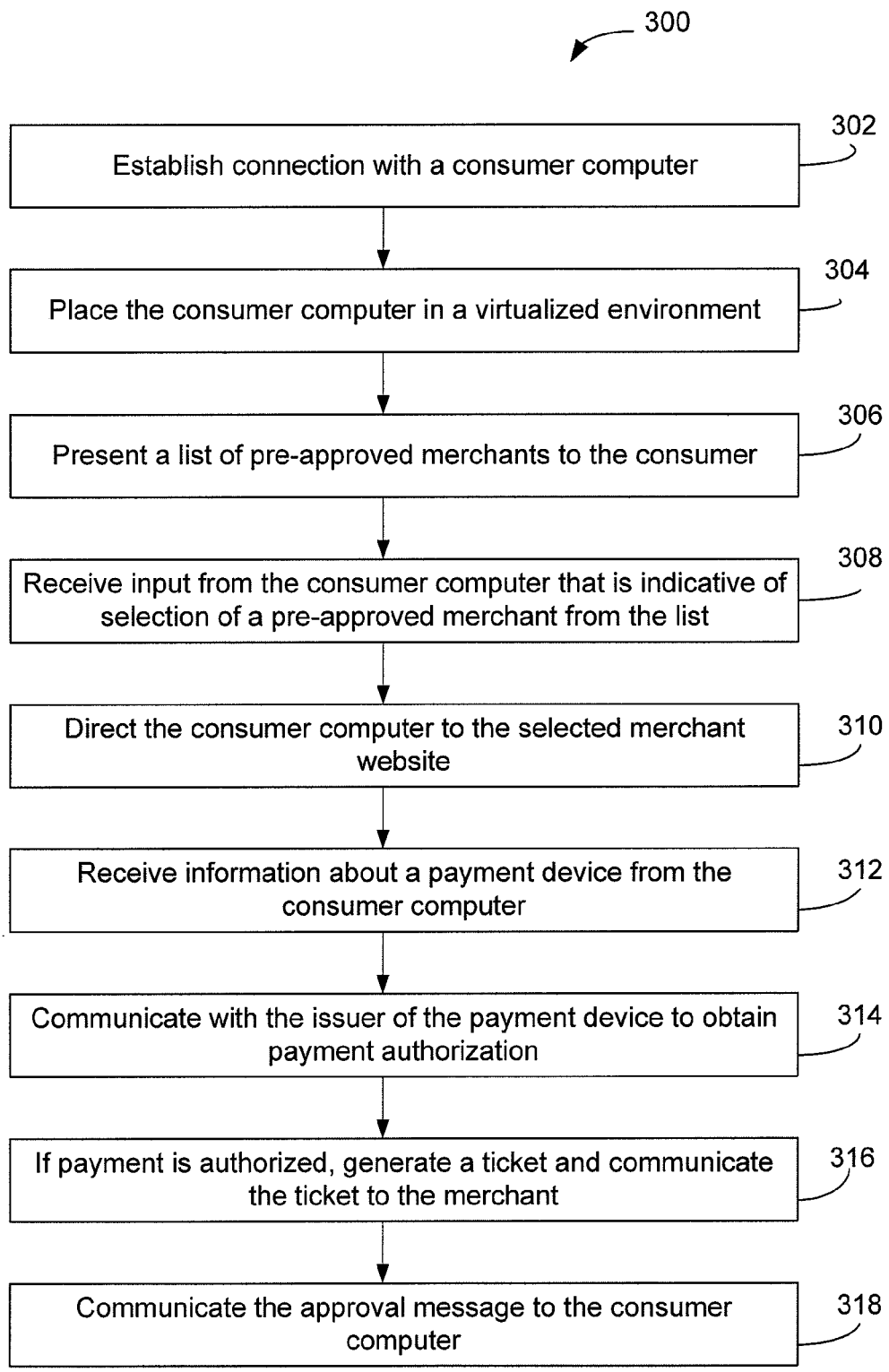
FIG. 3 is a flow diagram of a process for conducting payment transactions using a secured environment according to an embodiment of the present invention.

FIG. 3 is a flow diagram of a process 300 for conducting a secure online transaction according to an embodiment of the present invention. Process 300 may be performed by, e.g., server 202 of FIG. 2).

At step 302 a connection with a user communication device is established. Upon establishing the connection, the user communication device is placed in an virtualized environment at step 304. Thereafter, a list of preapproved merchants may be presented to the user via the user communication device at step 306. At step 308, an input is received from the user communication device indicating selection of merchant from the list. Based on the selection, the user communication device is directed to the merchant website at step 310. After the user has selected an item for purchase and elected to pay for the item, the server may receive information about a payment device (i.e. payment information as discussed above) from the user communication device at step 312. At step 314, the server may communicate with an issuer of the payment device to authorize the payment. If the payment is authorized, a ticket may be generated at step 316 and provided to the merchant. The ticket may include details of the payment authorization. At step 318, a message may be communicated to user communication device indicating successful completion of the payment process.

It should be appreciated that the specific steps illustrated in FIG. 3 provide a particular method conducting a secure online transaction according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives. For instance, upon placing the user communication device in the virtualized environment at step 304, a custom browser may be automatically launched prior to step 306.

Figure 4:
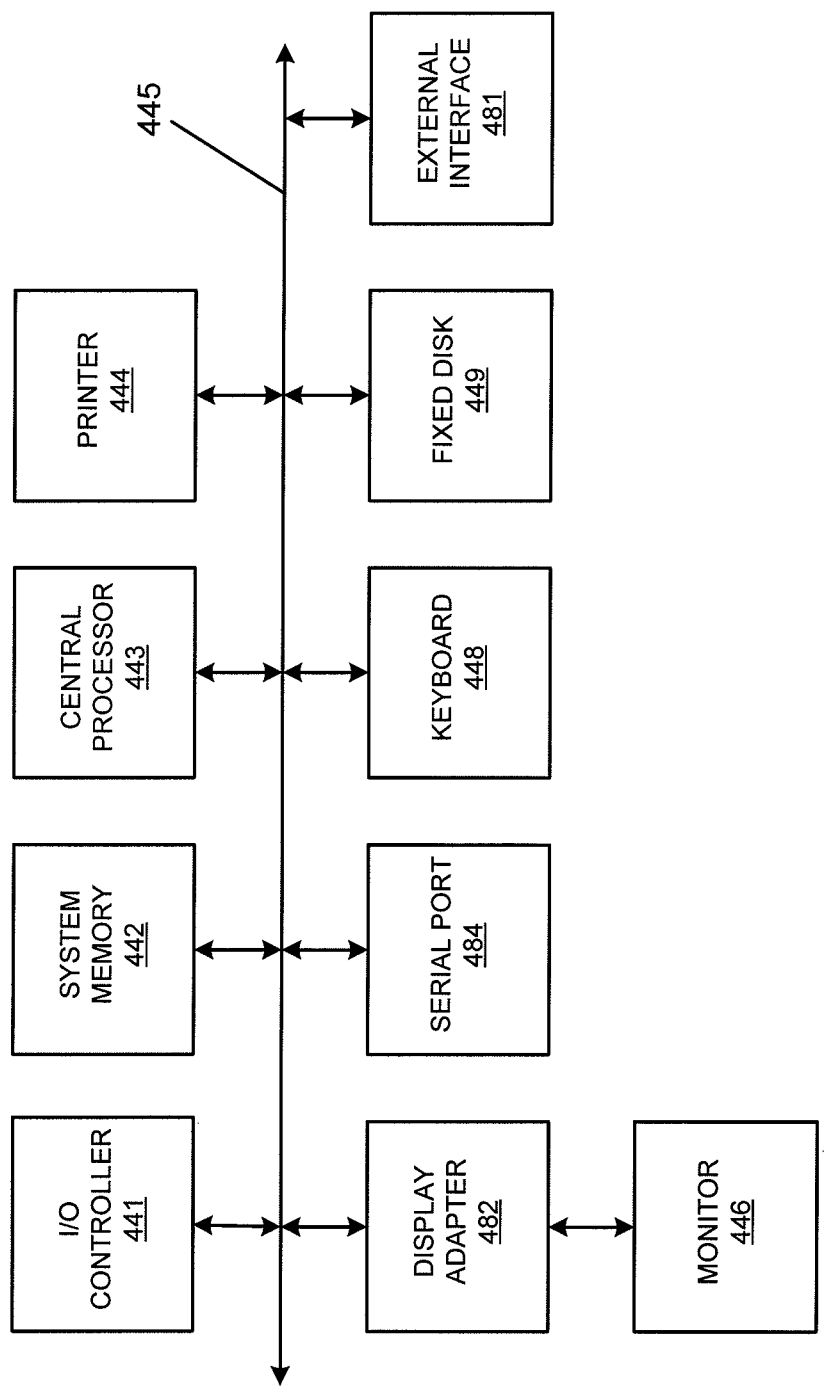
FIG. 4 is a block diagram for a computer apparatus.

FIG. 4 is a high level block diagram of a computer system that may be used to implement any of the systems and/or individual components described above in relation to FIGS. 1 and 2 and may include one or more of the subsystems or components shown in FIG. 4, which is a block diagram of a computer apparatus. The subsystems shown in FIG. 4 are interconnected via a system bus 445. Additional subsystems such as printer 444, keyboard 448, fixed disk 449, monitor 446, which is coupled to display adapter 482, and others are shown. Peripherals and input/output (I/O) devices, which couple to I/O controller 441, can be connected to the computer system by any number of means known in the art, such as serial port 484. For example, serial port 484 or external interface 481 can be used to connect the computer apparatus to a wide area network such as the Internet, a mouse input device, or a scanner. The interconnection via system bus 445 allows central processor 443 to communicate with each subsystem and to control the execution of instructions from system memory 442 or fixed disk 449, as well as the exchange of information between subsystems. The system memory 442 and/or fixed disk 449 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Thus, although the invention has been described with respect to specific embodiments, it will be appreciated that the invention is intended to cover all modifications and equivalents within the scope of the following claims.

What is claimed is:

1. A method comprising, by a computer system:
   establishing a connection with a user communication device;
   placing the user communication device in a virtualized environment, the virtualized environment being isolated from an operating system of the computer system;
   initiating a custom browser from within the virtualized environment;
   presenting a list of merchants to the user communication device via the custom browser, the custom browser only allowing a connection to one or more servers associated with a single merchant during a session and blocking communication with one or more servers associated with a different merchant;
   receiving an input indicative of selection of a first merchant from the list of merchants;
   causing a first session between the user communication device and a merchant server of the first merchant to be established; and
   directing the user communication device to a website of the first merchant.

2. The method of claim 1 wherein the list of merchants includes merchants that are pre-approved.

3. The method of claim 1 wherein the computer system allows the user communication device to only communicate with merchants in the list of merchants.

4. The method of claim 1 wherein the custom browser does not support one or more of the following:
   a scripting language;
   cookies;
   browser cache;
   browser history;
   browser bookmarks; and
   browser redirects.

5. The method of claim 1 further comprising:
receiving input from the user communication device, the input including payment information to pay for an item purchased at the first merchant, the payment information including information about a payment device;
communicating with an issuer associated with the payment device to authorize the payment; and
if the payment is authorized, sending a payment approval ticket to the first merchant.

6. The method of claim 5 wherein information about the payment device is not communicated to the first merchant.

7. The method of claim 5 wherein information about the payment device is stored in the computer system.

8. The method of claim 5 wherein communicating with the issuer is performed outside of the virtualized environment and without using the custom browser.

9. The method of claim 1 further comprising:
receiving input from the user communication device to terminate connection with the merchant server of the first merchant;
terminating the connection with the merchant server of the first merchant;
receiving another input from the user communication device indicative of selection of a second merchant from the list of merchants;
causing a new session between the user communication device and another server associated with the second merchant, wherein the computer system allows the user communication device to only communicate with the other server of the second merchant during the time when the new session is active.

10. The method of claim 1 wherein no information received or sent when operating from within the virtualized environment affects the operating system.

11. The method of claim 1 wherein the user communication device is placed in the virtualized environment subsequent to the connection with the user communication device being established.

12. A method comprising:
establishing, by a computer system, a connection between a user communication device and a merchant website from within a virtualized environment on the computer system, the virtualized environment being isolated from an operating system of the computer system, the merchant website being selected from a list of pre-approved merchant websites, and the computer system only allowing a connection to one or more servers associated with a single merchant during a session and blocking communication with one or more servers associated with a different merchant;
receiving, by the computer system, a first input indicative of purchase of an item from the merchant website;
receiving, by the computer system, a payment request message from a merchant server associated with the merchant website;
receiving, by the computer system, a second input indicative of selection of a payment method;
sending, by the computer system, a payment authorization request to a payment processing network;
receiving, by the computer system, a payment ticket from the payment processing network, the payment ticket indicative of results of the payment authorization request; and
communicating the payment ticket to the merchant server.

13. The method of claim 12 further comprising receiving an indication of successful completion of the purchase from the merchant server.

14. The method of claim 12 wherein the computer system only allows connections between the user communication device and a merchant website from the list of pre-approved websites.

15. The method of claim 12 wherein the connection between the user communication device and the merchant website is achieved via a custom browser operating within the virtualized environment.

16. The method of claim 15 wherein the custom browser does not support one or more of standard scripting languages, browser cache, cookies, browser history, browser bookmarks, and browser redirects.

17. The method of claim 12 wherein details about the payment method are not communicated to the merchant server.

18. The method of claim 12 wherein the payment authorization request is sent to the payment processing network outside of the virtualized environment.

19. The method of claim 12 further comprising:
providing the list of pre-approved merchant websites to the user communication device via a custom browser, the custom browser only allowing a connection to one or more servers associated with a single pre-approved merchant website during an active session between the user communication device and a merchant associated with the single pre-approved merchant website and not allowing another connection with another merchant during the active session.

20. A computer server comprising:
one or more processors; and
a non-transitory computer readable medium storing a set of instructions that, when executed, causes the one or more processors to:
establish a connection with a user communication device;
place the user communication device in a virtualized environment, the virtualized environment being isolated from an operating system of the computer system;
initiate a custom browser from within the virtualized environment;
present a list of merchants to the user communication device via the custom browser, the custom browser only allowing a connection to one or more servers associated with a single merchant during a session and blocking communication with one or more servers associated with a different merchant;
receive an input indicative of selection of a first merchant from the list of merchants;
cause a first session between the user communication device and a merchant server of the first merchant to be established; and
direct the user communication device to a website of the first merchant.

21. The computer server of claim 20 wherein the set of instructions further causes the one or more processors to:
receive input from the user communication device to terminate connection with the merchant server of the first merchant;
terminate the connection with the merchant server of the first merchant;
receive another input from the user communication device indicative of selection of a second merchant from the list of merchants;
cause a new session between the user communication device and another server associated with the second merchant, wherein the computer server allows the user communication device to only communicate with the other server of the second merchant during the time when the new session is active.

22. The computer server of claim 20 wherein the set of instructions further causes the one or more processors to:
receive input from the user communication device, the input including payment information to pay for an item purchased at the first merchant, the payment information including information about a payment device;
communicate with an issuer associated with the payment device to authorize the payment; and
if the payment is authorized, send a payment approval ticket to the first merchant.

* * * * *